(12) United States Patent  (10) Patent No.: US 7,881,438 B2
Cioffi et al.  (45) Date of Patent: *Feb. 1, 2011

(54) SELF-LEARNING AND SELF-ADJUSTING DSL SYSTEM

(75) Inventors: John M. Cioffi, Atherton, CA (US); Wonjong Rhee, Palo Alto, CA (US); Bin Lee, Mountain View, CA (US); Iker Almandoz, Palo Alto, CA (US); Georgios Ginis, San Francisco, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 1406 days.

This patent is subject to a terminal disclaimer.

(21) Appl. No.: 11/341,969

(22) Filed: Jan. 28, 2006

(65) Prior Publication Data

US 2007/0036339 A1  Feb. 15, 2007

Related U.S. Application Data

(60) Provisional application No. 60/686,734, filed on Jun. 2, 2005, provisional application No. 60/698,113, filed on Jul. 10, 2005.

(51) Int. Cl.
*H04M 1/24* (2006.01)
*H04M 3/08* (2006.01)
*H04M 3/22* (2006.01)

(52) U.S. Cl. .................................. 379/1.04
(58) Field of Classification Search ............. 379/1.04

See application file for complete search history.

(56) References Cited

U.S. PATENT DOCUMENTS 6,819,746 B1  11/2004  Schneider et al.

(Continued)

FOREIGN PATENT DOCUMENTS

DE  100 01 150 A1  7/2001

(Continued)

OTHER PUBLICATIONS

Communication relating to the Results of the Partial International Search, International Application No. PCT/IB2006/001117 (2 pgs).

(Continued)

*Primary Examiner*—Alexander Jamal
(74) *Attorney, Agent, or Firm*—Blakely, Sokoloff, Taylor & Zafman

(57) ABSTRACT

A self-learning and/or self-adjusting communication controller and/or optimizer uses operational data collected from a communication system to adjust operation of the communication system to changing operational, environmental, etc. conditions and, in some embodiments, to customize operation of the communication system's lines and components so that their performance can be controlled, improved and/or optimized. In various embodiments, operational parameters and/or rules are established and/or adjusted based on information obtained from the system concerning the system's operation; information regarding margins used by a DSL system and code violation counts reported by the DSL system are used to set margin levels for one or more line sets (each line set including an individual line, a group of lines, a binder, etc.) and/or other users and/or components of the DSL system; and, the controller and/or optimizer forces a small number of test lines into as yet un-experienced and/or unimplemented operational conditions so that new knowledge can be obtained.

22 Claims, 7 Drawing Sheets

U.S. PATENT DOCUMENTS

| | | |
|---|---|---|
| 6,829,307 B1 | 12/2004 | Hoo et al. |
| 6,834,109 B1 * | 12/2004 | Pare et al. .................. 379/416 |
| 2003/0086514 A1 | 5/2003 | Ginis et al. |
| 2006/0159232 A1 | 7/2006 | Jiang et al. |

FOREIGN PATENT DOCUMENTS

| | | |
|---|---|---|
| DE | 10001150 | 7/2001 |
| WO | WO00/051304 | 8/2000 |
| WO | WO 00/51304 A1 | 8/2000 |

OTHER PUBLICATIONS

International Search Report, International Application No. PCT/IB2006/001117 (6 pgs).
Written Opinion of the International Searching Authority, International Application No. PCT/IB2006/001117 (11 pgs).
Non-Final Office Action for China Patent Application No. 200680024128.5 dated Mar. 9, 2010; 13 Pgs.
Non-Final Office Action for European Application No. 06744630.2 dated Mar. 4, 2009; 5 pgs.
International Preliminary Report on Patentability for Application No. PCT/IB2006/001117 dated Dec. 21, 2007; 13 pgs.

* cited by examiner

SELF-LEARNING AND SELF-ADJUSTING DSL SYSTEM

CROSS-REFERENCE TO RELATED APPLICATIONS

This application claims the benefit of priority under 35 U.S.C. §119(e) of the following:

U.S. Provisional No. 60/686,734 filed on Jun. 2, 2005, entitled SELF-LEARNING AND SELF-ADJUSTING DSL SYSTEM, the entire disclosure of which is incorporated herein by reference in its entirety for all purposes.

U.S. Provisional No. 60/698,113 filed Jul. 10, 2005, entitled DSL SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital communications systems.

2. Description of Related Art

Digital subscriber line (DSL) technologies provide potentially large bandwidth for digital communication over existing telephone subscriber lines (referred to as loops and/or the copper plant). In particular, DSL systems can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

As DSL systems operate over a wider variety of environments, the management of DSL systems becomes more challenging. DSL system management has typically operated by collecting operational data from the DSL system and imposing usually static rules to set the DSL system control parameters. Such rules (or conventions, thresholds, relationships, etc.) are typically derived manually (for example by performing lab experiments to determine relationships between the operational data and the system control parameters). Thus, as DSL systems proliferate, DSL system management requires greater efforts to determine appropriate rules and conventions.

Systems, apparatus, methods and techniques providing self-learning and/or self-adjusting DSL management and control systems would represent a significant advancement in the art. Also, systems, apparatus, methods and techniques for such self-learning and/or self-adjusting DSL management systems that can automatically and autonomously derive rules, conventions, thresholds and relationships likewise would represent a significant advancement in the art.

BRIEF SUMMARY

Embodiments of the present invention utilize methods, techniques and apparatus that implement a self-learning and/or self-adjusting communication controller and/or optimizer that uses operational data collected from a communication system to adjust operation of the communication system to changing operational, environmental, etc. conditions and, in some embodiments, to customize operation of the communication system's lines and components so that their performance can be controlled, improved and/or optimized. A "self-learning" system is one in which software, apparatus, etc. and/or combinations thereof (for example, a controller, DSL optimizer, DSM center or the like) keeps statistics on each and all lines, binders, etc. and continuously analyzes and updates those statistics. "Self-adjusting" systems create, update, etc. DSL line profiles, rules therefor and the like, typically setting operational and/or control parameters (which frequently are the same thing) adaptively with time.

Examples of these systems are provided herein. In some embodiments of the present invention, operational parameters and/or rules are established and/or adjusted based on information obtained from the system concerning the system's operation. In some embodiments, information regarding margins used by a DSL system and code violation counts reported by the DSL system are used to set margin levels for one or more line sets (each line set including an individual line, a group of lines, a binder, etc.) and/or other users and/or components of the DSL system. In some embodiments of this invention, the controller and/or optimizer forces a small number of test lines into as yet un-experienced and/or unimplemented operational conditions so that new knowledge can be obtained.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1A:
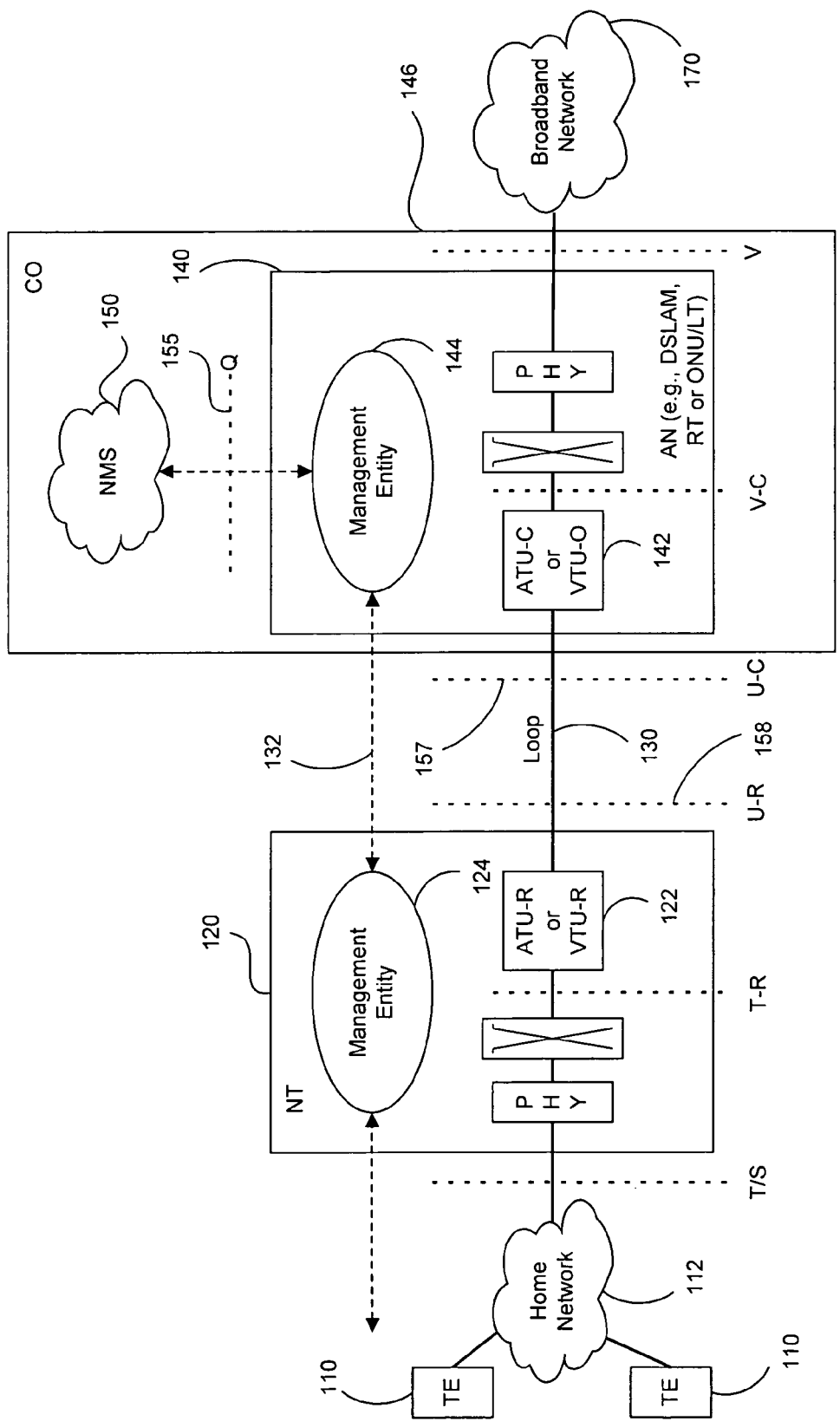
FIG. 1A is a schematic block reference model system per the G.997.1 standard applicable to ADSL, VDSL and other communication systems in which embodiments of the present invention may be used.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

A controller, such as a DSL optimizer, dynamic spectrum management center (DSM Center), a "smart" modem and/or computer system can be used to collect and analyze the operational data and/or performance parameter values as described in connection with the various embodiments of the present invention. Such a controller also can be used to implement the methods and techniques of the present invention. The controller and/or other components can be a computer-implemented device or combination of devices. In some embodiments, the controller is in a location remote from modems or other communication equipment coupled to a communication line. In other cases, the controller may be collocated with one of or both of the "local" devices (that is, devices directly coupled to a communication line or part of such a local device) as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Some of the following examples of embodiments of the present invention will be used in connection with one-sided or two-sided vectored ADSL and/or VDSL systems as exemplary communications systems. Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the present invention may be applied to various communications systems, and the invention is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. NMS is in some instances also referred to as an Element Management System (EMS). A network management protocol is used by the manager and agents to exchange management information and data. The unit of management information is an object. A collection of related objects is defined as a Management Information Base (MIB).

FIG. 1A shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+ (G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1A, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 1A, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication and/or data transmission services.

Several of the interfaces shown in FIG. 1A can be used for determining and collecting operational and/or performance data. To the extent the interfaces in FIG. 1A differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Technical Report TR-069, entitled "CPE WAN Management Protocol" from the DSL Forum, dated May 2004. Finally, DSL Forum Technical Report TR-064, entitled "LAN-Side DSL CPE Configuration Specification" from the DSL Forum, dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is less common for lines sharing the same binder to terminate on the same line card in ADSL, than it is in VDSL. However, the discussion of DSL systems may be extended to ADSL, also, because common termination of same binder lines might also be done (especially in a newer DSLAM that handles both ADSL and VDSL). In a typical topology of a DSL plant, in which a number of transceiver pairs are operating and/or available, part of each subscriber loop is collocated with the loops of other users within a multi-pair binder (or bundle). A typical binder in a telephone network consists of 25 to 100 pairs of copper twisted wire pairs. Multiple DSL service signals in a common binder can create NEXT and FEXT that potentially become dominant impairments to other DSL service signals in the same binder. After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 1B:
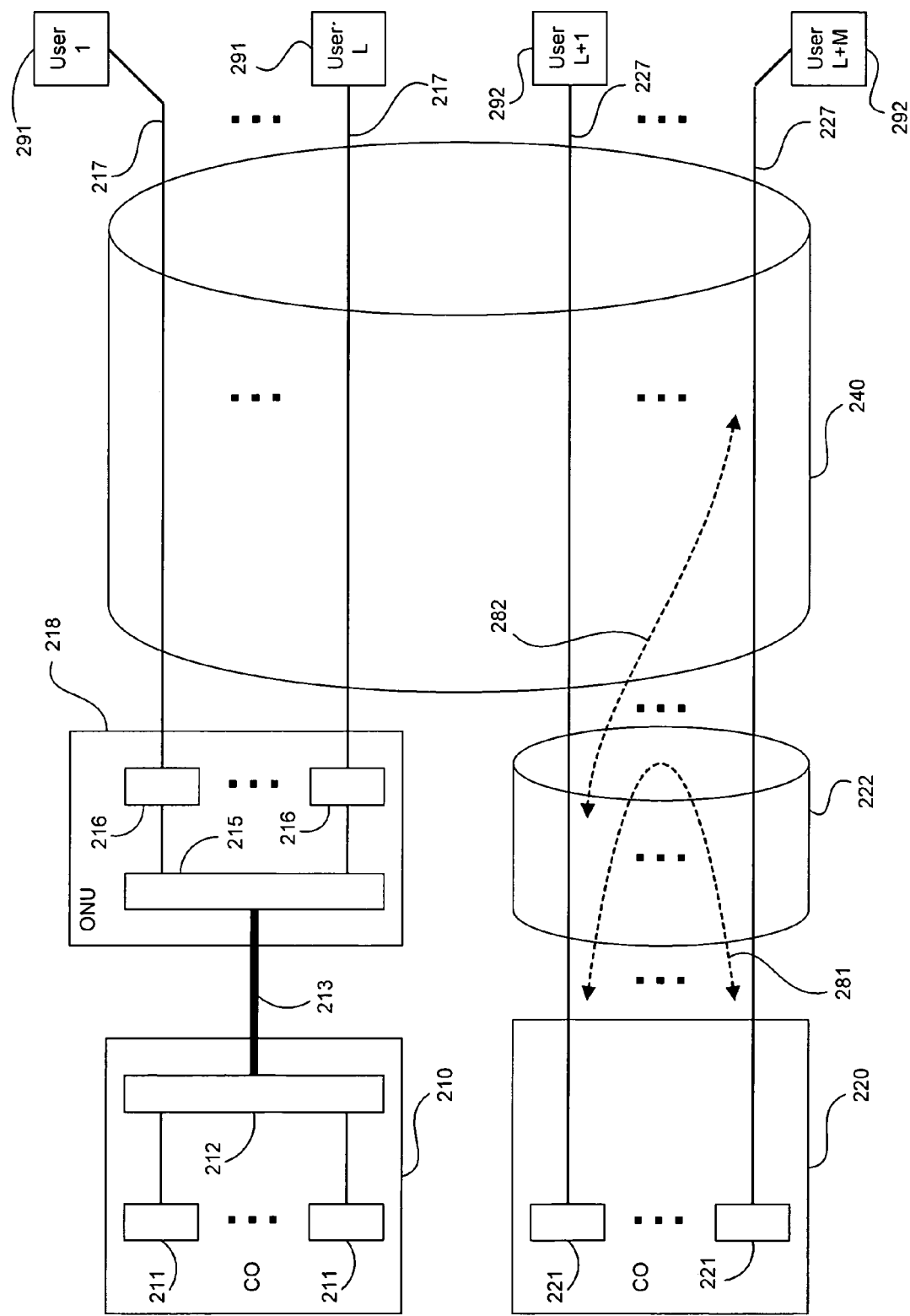
FIG. 1B is a schematic diagram illustrating generic, exemplary DSL deployment.

A generic, exemplary DSL deployment scenario is shown in FIG. 1B. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 1B, L customers or users 291 are connected to CO 210 using a combination of optical fiber 213 and twisted copper pairs 217, which is commonly referred to as Fiber to the Cabinet (FTTCab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 1B, the lines from CO 220 to users 292 share binder 222, which is not used by the lines between CO 210 and users 291. Moreover, another binder 240 is common to all the lines to/from CO 210 and CO 220 and their respective users 291, 292. In FIG. 1B, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NMS can be found therein; others may be known to those skilled in the art.

Common problems in communication systems might be clearly observable. After identifying and understanding such a problem, future corrective and/or remedial action often can be quickly developed to address the problem. In ADSL, for instance, lines with unstable performance caused by high code violation (CV) counts might be commonly and easily observable. As a result, remedial action such as an increase of signal to noise ratio margin (TSNRM, also called "target signal-to-noise-ratio margin") or change of INP/DELAY FEC settings can be implemented for the lines. An increase in TSNRM on subsequent trainings and/or an increase of the INP setting will reduce the CV count upon subsequent training or implementation of the changed parameter. Several successive increases of TSNRM and/or INP may lead to an acceptably low CV count after which further increases in TSNRM or INP would not be necessary. Some problems, however, may not be as easily observed, if directly observable at all. A controller (such as a DSL optimizer), not seeing direct evidence of such a problem, might not be able to take appropriate action.

In some communication systems, an appropriate range of system configuration parameters and rules may be obvious so that a simple rule and/or parameter range might be applied to the entire network (a "one size fits all" approach). In ADSL, for instance, it is well known that the minimum noise margin should be 0 dB or above to avoid unreliable services. Most operators therefore set the minimum noise margin level at 0 dB. Static rules, both appropriate and inappropriate, abound in various communication systems such as DSL systems. In many cases, a rule that is appropriate at or during a given time may later be inappropriate because of changes in the communication system.

Embodiments of the present invention provide methods and apparatus implementing self-learning and/or self-adjustment by a communication system regarding any of the system's existing or potential problems and/or an appropriate range of configuration parameters for improving and/or maximizing system performance in a communication network. In this invention, operational data is collected and analyzed (preferably over a sufficiently long period of time for the data to be an accurate indicator of line and/or system behavior), after which the system or a controller in or coupled to the system learns information about the system's performance, processes the information to update the controller's understanding of system operation, and adjusts and/or constructs rules or actions that will improve or otherwise alter performance of the network or a line set within the network in a desired manner (for example, improvement in an individual line's performance, or improvement in the performance of a group of lines, such as a binder group).

The following examples of the present invention use DSL systems as illustrative communication systems. However, the present invention may be applied to any general communication system and to rules, data fields and/or parameters other than those pertaining to noise margin.

In ADSL, the target noise margin often is set in the general range of 6-8 dB to provide reliable service to the majority of the lines while achieving reasonable data rates. Some lines, however, might need larger target margins to achieve reliable service (for example, because of highly time-variant noise characteristics), while some lines might require only 3-4 dB of margin (for example, because they experience primarily time-invariant noise characteristics). Examples of other parameters and/or thresholds that can be adjusted to yield information during learning include:

The CV threshold for changing INP, delay or data rate of the link;

The threshold on retrain counts for changing the link's INP, delay or data rate;

Noise spectrum shapes (or related thresholds) for altering transmit spectrum settings (for example, the PSDMASK setting or CARMASK setting) or spectrum use on the link Time-variation or distribution characteristics of the noise spectrum for changing a BCAP[n] setting (BCAP[n] is used to limit the maximum number of bits in each DMT tone); and Margin and/or CV levels and/or reported maximum attainable data rate to adjust other lines' behavior (in fact, much of what is disclosed herein could be implemented across all lines in a binder—that is, monitoring one line, taking actions on another, and the binder self-learning its responses and appropriate consequent actions).

Generally, embodiments of the present invention collect operational data that provides information about performance (for example, SNR, margins, data rates, CV counts, retrain counts, etc.) and then adjust one or more control data (for example, PSDs, MAX/MIN/target margins, data rates, FEC parameters such as INP/DELAY, etc.) to learn which influence (improve or impair) performance. Each line then can be maintained or adjusted dynamically to provide desired (maybe even optimal) performance. Some of the collected operational data and available control data (ranges, threshold values, etc.) also can be viewed for a line set (a single line, a group of lines, etc. such as a binder). As a system controller learns more about the system(s) with which it operates, it can select operating conditions to maintain, improve, optimize or otherwise control system performance by learning the causal relationships between control data and performance. Thus, generally, embodiments of the present invention allow a controller such as a DSL optimizer to update its knowledge of the system and system dynamics and, based thereon, to control and adjust operational parameters in response to line, binder and/or system conditions, rather than having individuals set rules statically (and typically slowly) in response to observed data.

It is well known that a lower target margin results in a higher data rate. Thus it is desirable to set a line's target noise margin at the lowest value that guarantees reliable or otherwise acceptable or desired service. An adaptive choice of margin for an individual line can bring significant performance improvement, as will be appreciated by those skilled in the art. Thus it is very helpful to determine an appropriate margin level for an individual line.

Similarly, altering FEC parameters (for example, INP and delay parameters) can increase the data rate or throughput of a given line by reducing delays caused by FEC coding. Where adjustments to one or more control parameters in a system reduce the number of code violations or other indications of errors or problems, it may be possible to then alter the FEC parameters to reduce delays due to FEC coding. Other, similar control parameter adjustments, if shown to have a beneficial effect on operational data, can improve operation of a given DSL or other communication system, as will be apparent to those skilled in the art.

Using embodiments of the present invention pertaining to monitoring and evaluating margins, a self-learning device (for example, a controller, DSL optimizer, processor or module) can examine (for example, continuously or periodically) a suitably sufficient amount of collected operational data obtained from a communication system and/or network, and reliably determine the minimum margin level that is adequate for each individual line for which relevant data is available. For example, a self-learning device might determine that a 4 dB margin target is adequate for lines that show less than 3 dB of margin change in the previous 2 months. The controller may then subsequently adjust the rules used in various components of the system to reflect this information. At the same time, the self-learning device might determine that a 10 dB margin target is adequate for the lines that show 4-6 dB of margin changes in last two months, and adjust the rules for the subject lines to reflect that guideline. Because SNR margin is function of data rate as well as the channel insertion loss and noise spectrum, the maximum data rate might be jointly adjusted with target SNR margin. Such rules generated by a self-learning device are thus preferred to static rules or rules produced by manual observation and manipulation of operational data because of the advantages of automation (speed, automated updating, etc.) that are enabled by the self-learning device.

Various methods can be implemented that use operational data input(s) to calculate whether a control parameter change is desirable. Desirability may be determined by one or more criteria such as better "numbers" (for example, higher data rates, lower CV counts, etc.) and/or more subjective factors (for example, reduction in the likelihood of user complaints). Embodiments of the present invention can use one or more control parameters to evaluate performance changes. When a set (for example, a vector) of one or more control parameters $C_{parameters}$ is implemented, the resulting change in a given line set S can be measured. This measurement may be a vector of performance scores $P_{scores}$ based on collected operational data $D_{operational}$, where the scores reflect improvements that users and/or operators might find beneficial. If the scores are good, then the adjusted control parameters are maintained. Where performance drops as a result of the control parameter implementation, the system can return to the control parameters previously in use.

The set of control parameters $C_{parameters}$ can be a single parameter value, multiple parameter values, a single-control rule, multiple-control rules, etc. It may be possible to evaluate a number of single-control parameters individually, then plot and/or calculate what combinations of changes are likely to yield favorable performance changes. Similarly, $P_{scores}$ can have a single entry or a plurality of entries that allow a controller to consider more complex interrelationships between various control parameters. Also, line set S can be a single line, a group of lines, a binder, a region, etc. Finally, where a particular adjustment is shown to improve a line set's performance, that adjustment (or information/knowledge gained from one or more such adjustments) may be tested and/or implemented in other line sets to achieve analogous system operational benefits and/or control.

In another embodiment, a statistical state machine can be constructed using a performance function $$R = f(D_{operational}, C_{parameters})$$

that is defined where $D_{operational}$ is the vector of all the operational data reportable by the line set S and $C_{parameters}$ is the vector of all the controls that a controller such as a DSL optimizer could implement in the state machine to describe the changing of profiles/service for the line set. When R increases, better line set conditions are achievable. The "derivative" of R with respect to each and every control determines whether R can be increased or decreased by changing $C_{parameters}$. That derivative can be obtained by examining existing data (for example, in a library or database) or by slightly "moving" or adjusting the $C_{parameters}$ of a small set of test lines and then observing the effects on R. Controls can be selected to improve R or alter it in some desired fashion. An example is a gradient algorithm that is well-known to those skilled in the art:

Given $C_{parameters}$ as a starting point,
Repeat
1. Compute search direction vector from V=−(derivative of R w.r.t. $C_{parameters}$)
2. Line search. Choose scalar step size t via line search that searches t that maximizes R=f($D_{operational}$, $C_{parameters}$+ t·V). A small scalar constant or a constant diagonal matrix may be used as t if line search is not applicable.
3. Update $C_{parameters}$ with $C_{parameters}$+t·V Until stopping criterion (for example, R is increased less than a threshold in last iteration) is satisfied.

In some embodiments of this invention, a methodology used for updating the set of control parameters $C_{parameters}$ can be viewed as being related to the algorithm area variously known as "non-supervised learning" or "clustering" or "vector quantization" (though none of these fields has been applied in a manner similar to that used in connection with embodiments of the present invention). A basic description of an example method is provided herein based on the "Generalized Lloyd's Algorithm," which is well-known to those skilled in the art.

A DSL line set S and a set of control parameters $C_{parameters}$ are first selected for the purpose of updating $C_{parameters}$ to improve some performance aspect of the DSL line set. Candidate values considered to be reasonable are selected for $C_{parameters}$, though the real impact of this value set on the DSL line set might not be known exactly. Each candidate value of $C_{parameters}$ may then be applied to a subset of line set S, after which operational data $D_{operational}$ (for example, code violation counts) are collected for the line set S.

The operational data can be classified using a clustering method as described below. Following the classification, each DSL line or line set is represented by a point in a vector space, and such points corresponding to DSL lines and/or line sets are assigned to one of a number of "clusters." Each cluster represents a group of classified DSL lines, wherein the classified DSL lines share similarities among their corresponding operational data (for example, lines within a cluster have comparable code violation counts). A self-learning/self-adjusting device can then examine the values of $C_{parameters}$ used in clusters exhibiting desirable effects (for example, low code violation counts), and discover those values of $C_{parameters}$ that lead to superior performance. Such discovered values of $C_{parameters}$ can later be applied to improve operation on the subject line set and/or on other line sets.

A clustering method, as mentioned above, consists of a training stage and a classification stage. Let x be the vector of data collected from a DSL line from set S (drawn from operational data $D_{operational}$). Let $y_i$, i=1, ..., C be vectors associated with C clusters, where each cluster corresponds to a group of lines with similar operational data.

The classification stage of the methodology performs the step of finding the cluster/model i for which $d(x,y_i) \leq d(x,y_j)$ for any j other than i, where d is some appropriate distance measure. The training stage of the methodology involves the following steps:

i. Initialize vectors $y_i$, i=1, ..., C.
ii. Perform one or more iterations to obtain new model vectors $y_i$, i=1, ..., C based on a training set of data.

iii. Compute the total distortion for the training set of data.
iv. If the total distortion is smaller than some threshold, then exit; otherwise, go to step ii.

Steps ii and iii are now described in more detail.

For step ii:
a) For each vector x belonging to the training set, find the cluster/model i for which $d(x,y_i) \leq d(x,y_j)$ for any j other than i.
b) For each cluster, recompute $y_i$ as the mean of all vectors x of the training set that also belong to cluster/model i. "Mean" is defined here to be any appropriate averaging operation, as will be appreciated by those skilled in the art.

For step iii:
a) Compute total distortion as $D=\text{average}[d(x,y_i)|d(x,y_i) \leq d(x,y_j), j \neq i]$. In other words, it is the average distance of each vector of the training set of data from the closest $y_i$ vector.
b) By using the above classification stage methodology, vector x of observed data can be classified into one of C clusters, where each cluster is related to one or more lines with similar operational data.

Figure 2:
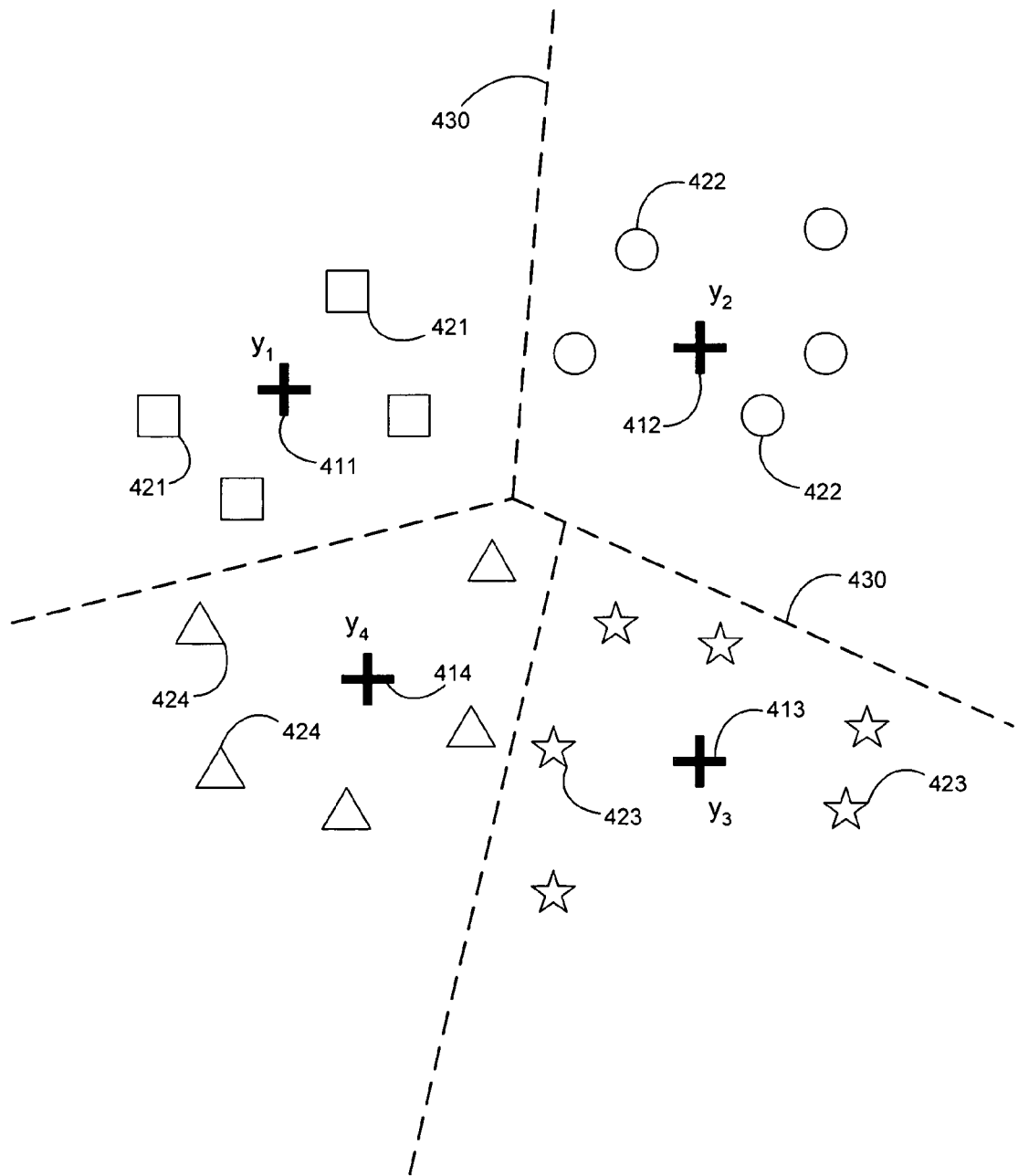
FIG. 2 is a diagram illustrating clustering as used to classify communication lines in some embodiments of the present invention.

FIG. 2 illustrates one embodiment of the present invention implementing the previous example and using clusters for the case of 4 clusters. Each cross 411, 412, 413, 414 corresponds to a vector $y_i$. The classification of DSL lines into clusters also is shown, where DSL lines classified into the same cluster are shown as squares 421, circles 422, stars 423 and triangles 424 bounded by the lines 430 of FIG. 2.

The clusters of FIG. 2 group together lines that have similar operational data. Inspection of the cluster (or clusters) that show desirable attributes for the operational data (for example, high data rate, low counts of code violations, low rate of customer complaints) leads to values of the set of control parameters $C_{parameters}$ that yield such desirable effects. Thus, improved values of control parameters can be adaptively learned, catalogued, consulted and implemented.

Embodiments of present invention may be applied to determine a parameter set for a first line set so that a second line set may benefit from the information gleaned by the first line set's operation. For instance, downstream transmission in a binder of DSL lines emanating from a CO DSLAM (the first line set) that are affected by crosstalk from a set of lines transmitting downstream from an RT DSLAM (the second line set) can be considered. A self-learning controller or other apparatus/device may collect operational data and analyze performance of the first line set for various control parameters applied to the second line set. Preferred or optimal control parameters of the second line set then can be identified based on the collected operational data and subsequent analysis. In some embodiments of this invention, the self-learning device might try several control parameter sets that can include various second line set settings for PSDMASK, CARMASK, transmit power, maximum data rate, TSNRM, MAXSNRM, MINSNRM, BCAP, etc. to generate collectable operational data for the first line set. Based on what it has learned, the self-learning device may choose a set of control parameters for the second line set (in some cases also for the first line set) that improve or otherwise alter the overall performance of either or both line sets in some desired fashion.

The operational data may be examined for multiple line conditions by a self-learning controller (for example, a DSL optimizer) to detect certain line problems. In one exemplary embodiment, a typical DSL loop consists of multiple copper wire segments that are spliced together to form the loop. As will be appreciated by those skilled in the art, a badly spliced connection causes a significant loss of signal power, especially in low frequency ranges. A self-learning controller may have access to operational data from and/or relating to a first line set and/or cluster that is known to have bad-splice problems, and a second line set and/or cluster known to not have such problems. The self-learning controller can compare operational data collected from and/or about the two sets to discover the sets' different characteristics. Statistical and/or other information learned from studying the first and second line sets (for example, ratios between upstream and downstream attenuations, ratios between upstream and downstream maximum attainable data rates, etc.) may be used to construct rules for detecting bad-splice characteristics of lines whose splicing conditions are not known.

As more information is obtained regarding the performance of the line set over time and in response to a wider variety of control data, more precise evaluations of the causes and effects of control data implementations can be developed. In some cases, this knowledge base may provide an ability to "tune" a system or line set more finely. In other cases, broader general rules concerning line operation may be gleaned and later implemented. Time variations and other changes in system and line set operation can be examined and accommodated as well.

In some cases, there might be insufficient data (for example, in terms of quantity or timeliness) to evaluate a given line set. The self-learning system might then force some of the communication lines to operate with specified configurations (for example, control data) so that the desired data can be collected and one or more efficient rules derived. In some cases, it might be beneficial to examine processed information such as a Hidden Markov Model (HMM) of channel, noise or user data activity. A self-learning device according to the present invention might examine such processed information together with unprocessed operational data and find appropriate information, rules or actions to improve the communication system and/or network performance.

The evaluation of a line, binder, system, etc. and how it should be configured, maintained or altered and/or any other evaluation of operational data according to embodiments of the present invention may be required to be based on the most recently available operational data pertaining to performance and/or one or more operational conditions, or may be based on historical data as well as the current data. For example, if a noise source (for example, an appliance or other device) that has caused performance problems in the past is removed (for example, thrown away), its prior influence on one or more lines under consideration should be removed or at least reduced. Therefore, if historical data is used, it can be weighted in any suitable manner. For example, a data weighting vector (W) can be given to each line and/or operational condition so that the weighting of current and historical data can be applied as a function of how current the data is. For instance, if the weighting vector is W1=[1 1 1], then the data from the last three update periods (for example, days) are given equal weight in learning about a system's performance and/or updating an existing model or evaluation of that system (be it one line, several lines, a binder, a region, etc.). If the weighting vector is W2=[1 0 0 0 0 0 0 0.5], then the data from the last reported operational condition data is used with weighting 1 and data from 7 update periods earlier (for example, one week ago) is used with weighting 0.5. Data from other update periods are ignored. If it is desired to use data from only the last 2 months with equal weighting, then the weighting vector can be of size 60 with all ones (that is, W3=[1 1 1 . . . 1 1 1]), using an update period of one day.

Different weighting vectors can be used for different operational conditions, for example depending on whether a single reading should serve as the basis for any decision about a system model and/or change to an existing system's operation.

In addition to the timeliness of the operational data considered, the evaluation of whether any decision should be made and/or action taken, and/or any other evaluation of operational data, may be required to be based on a sufficient quantity of available operational data. For example, in some cases, the data collection system might malfunction or be inactive, meaning that too little or no data might be available. In such cases, it might be helpful for the system to abstain from making any changes to a system and/or line operation, or any limits and/or parameters applicable thereto, when there is insufficient data on which to base reliable evaluation. To prevent an inappropriate change from being implemented, implementation of a change can be limited only to those cases when sufficient additional data has been collected since the last evaluation or within a specified time period. Operational data can be viewed using cardinality techniques and data probability distributions. Sophisticated distribution estimation can be used to reduce the influence of distant past values in favor of more recently collected data and are well understood by those skilled in the art. If a data sufficiency or timeliness rule is not satisfied, then no action may be taken until new data is collected that allows such a rule to be met.

In summary, embodiments of the present invention can be used to implement a self-learning device, controller and/or system that learns about system performance and can adjust the system based on operational data that is collected from the communication system. The adjustment may be based on raw (that is, unprocessed) data and/or be based on processed data (for example, where the processed data is a cluster representation or an HMM of channel, noise and/or user data activity). Certain configurations and/or control parameters may be enforced in the communication system to ensure that desired data can be collected for one or more self-learning processes, especially in situations where insufficient data is available for collection. Analysis of the collected data (which can be performed automatically by a processor, controller, DSL optimizer and/or other device) can be used to determine rules and/or future actions that can improve the performance of a network, an individual user and/or a group users (for example, a binder in a DSL system). Among other aspects of the communication system, rules and/or ordering actions in a DSL system can be changed based on the analysis, which again can be performed automatically.

Figure 3:
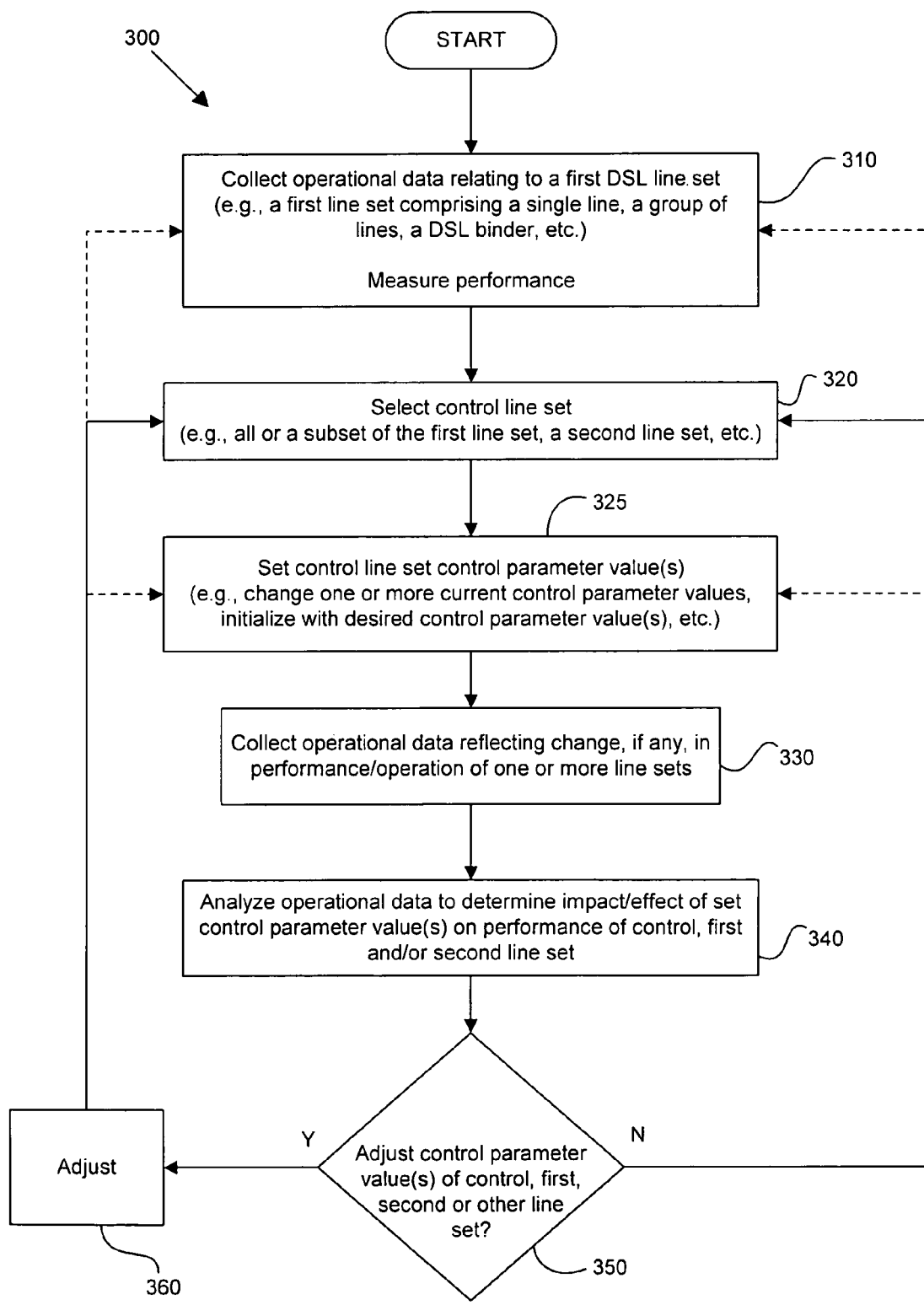
FIG. 3 is a flow diagram illustrating one or more embodiments of the present invention.

One embodiment of the present invention is shown in method 300 of FIG. 3. This method 300 can be adapted in various ways described below and as will be apparent to those skilled in the art. Moreover, method 300 can be implemented in whole or part as software (for example, a computer program product or the like) and/or can be performed by various apparatus embodiments of the present invention (for example, one or more of the following—a controller, DSL optimizer, computer system, processor, etc.).

In one embodiment of the present invention, the method can be interpreted as controlling operation of a first DSL line set (which can have a single line or multiple lines). A control DSL line set is selected (which also may have a single line or multiple lines and can be the same as the first DSL line set, different from the first DSL line set, share a binder with the first DSL line set or not, etc.). The first line set may consist of lines all located in the same binder or other physical grouping or may be a variety of lines from different locations to provide a greater diversity in line selection. Similarly, the control DSL line set may consist of lines all located in the same binder or other physical grouping or may be a variety of lines from different locations to provide a greater diversity in line selection. As will be appreciated by those skilled in the art, the selection of line sets will depend on the information sought, a target or desired performance sought, etc.

The control DSL line set is operated using a first value of a control parameter vector (which can consist of a single parameter value or multiple parameter values) in a subset of the control DSL line set. The parameters that can be used to construct a control parameter vector can include TSNRM, target noise margin, MAXSNRM, maximum noise margin, MINSNRM, minimum noise margin, CARMASK, PSD-MASK, maximum transmit power, maximum delay, minimum INP, trellis coding on/off, pilot signal on/off, maximum data rate, minimum data rate, BCAP[n], CV count thresholds used for determining maximum delay, CV count thresholds used for determining minimum INP, FEC count thresholds used for determining maximum delay and/or FEC count thresholds used for determining minimum INP. The operational data collected can include average attenuation measurements, bit distributions, transmit power levels, reported current data rates, reported maximum attainable data rates, reported error-correction-parity, reported use of trellis codes, channel insertion loss, channel gains, channel phases, FEC code settings, total number of bit-swaps occurring in a recent time interval, FEC errors, code violations, errored seconds, noise power, peak-to-average noise power ratio, quiet-line noise levels, active-line noise levels, count of ATM or other protocol cells, higher-level protocol-throughput, retrain counts, count of failed synchronization attempts, reported carrier mask and/or reported tone-shaping parameters.

As will be appreciated by those skilled in the art, the control DSL line set subset may be a single line from the control DSL line set, multiple lines from the control DSL line set or all of the lines in the control line set. Operational data is collected relating to operation of the control DSL line set using the first value of the control parameter vector in the subset of the control DSL line set and that operational data is analyzed. Based on the analysis of the collected operational data, one or more control parameters of one or more lines in the first line set can then be adjusted. Operational data also can be collected from the first DSL line set at any appropriate time.

Analysis of the collected operational data can include defining a performance metric and evaluating a gradient of the performance metric with respect to the control parameter vector. The control parameter vector value then can be updated in the direction of the evaluated gradient. Alternatively, the collected operational data can be classified into multiple clusters, each of which has a performance metric associated with it. A cluster can be selected based on its performance metric and the control parameter vector value then updated to match a control parameter vector value of the selected cluster.

The general process can be repeated by operating the control DSL line set using a second value of the control parameter vector in the subset of the control DSL line set and thereafter collecting operational data relating to that operation of the control DSL line set, thus providing multiple reference points to assist in assessing the effect of changes to the control parameter vector on one or more DSL lines. Other comparisons can be made by using historical operational data pertaining to the first DSL line set and/or the control DSL line set. Such historical operational data can be maintained in a library or database in controller or in another location, as will be appreciated by those skilled in the art.

The method 300 begins with the collection of operational data relating to a first DSL line set (for example, a single line, a group of lines, a DSL binder, an entire network, etc.). In a DSL system, this operational data can be any of the data that provides information about performance and operation of the DSL system generally and/or the selected line set in particular. The performance of the selected line set and/or other line sets can thus be measured or estimated.

At 320 a line set is chosen to serve as a control set (sometimes referred to as a control data set). This line set may be the same line set for which operational data was collected at 310, or may be a subset of the line set at 310, or may be an entirely distinct line set. In cases where crosstalk between DSL lines is important, the first line set may be one or more DSL lines in a binder and the second line set may be one or more other DSL lines in the same binder. Once the control set has been chosen at 320, one or more control parameters of the lines belonging to the control set are changed or set at 325. The one or more control parameters may be a collection of control parameters used to stimulate the system so that knowledge of system operation and line behavior can be learned. Operational data reflecting changes in the performance and/or operation of the first DSL line set and/or the control line set can be collected at 330.

At 340 the collected operational data from 330 is analyzed to determine the impact of the setting/changing of the control parameter(s) of the control line set on one or more of the line sets of interest (for example, the first DSL line set, the control line set, etc.). Analysis may take the form of an algorithm or other process(es) such as those specifically discussed as examples herein or others known to those skilled in the art that allow a controller, DSL optimizer, etc. to evaluate the impact of the operation of the control DSL line set. Such analysis may yield information that can be used to extrapolate rules and other operational guidelines that can be used for the management of the DSL system. Where all of the method 300 is implemented in connection with a single communication line, analysis of the operational data at 340 may be very straightforward and be used to adjust that single line's operation.

Where operation of a group of lines or line sets is being optimized or otherwise controlled, the analysis may involve evaluating the interrelationships of the various lines and the performance effects of the values of control parameters implemented on one or more lines. In addition, some of the information learned during the analysis of collected operational data pertaining to the first line set and/or the control line set can be applied to lines not used in generating that operational data; that is, lines other than those in the first line set and the control line set (if different). Finally, where method 300 is used to detect one or more problems that cannot be addressed through adjustments to operating parameters and the like, but instead, for example, requires a service call or other action, the analysis at 340 may be used to assist in current and future problem detections and the like.

Where operational parameter adjustment is available to control operation, then a decision 350 can be made as to whether one or more operational parameters should be adjusted. If no such adjustment is required or appropriate, then method 300 can return to 320 to again select a control line set to increase the knowledge base about the communication system. Alternatively, method 300 may return to 310 to evaluate a different first line set, to update existing information about one or more line sets or to look at a different aspect of the communication system altogether. Also, method 300 may return to 325 to reset or readjust the control parameter(s) in the control line set. Where adjustment of one or more of the operational parameters will achieve a desired effect, then the change(s) can be implemented at 360 before returning to updating and/or other learning at 310, 325 and/or 320.

Various apparatus according to the present invention can implement one or more of the methods and/or techniques discussed above. According to one embodiment of the present invention shown in FIG. 4A, a learning/adjustment control unit 400 may be part of an independent entity coupled to a DSL system, such as a controller 410 (for example, a device functioning as or with a DSL optimizer, DSM server, DSM Center or a dynamic spectrum manager) assisting users and/or one or more system operators or providers in operating and, perhaps, optimizing use of the system, including implementation of self-learning configuration techniques and methods and/or controls based thereon. (A DSL optimizer may also be referred to as a dynamic spectrum manager, Dynamic Spectrum Management Center, DSM Center, System Maintenance Center or SMC.) In some embodiments, the controller 410 may be in or part of an ILEC or CLEC operating a number of DSL lines from a CO or other location. As seen from the dashed line 446 in FIG. 4A, the controller 410 may be in the CO 146 or may be external and independent of CO 146 and any company operating within the system. Moreover, controller 410 may be coupled to, communicating with and/or controlling DSL and/or other communication lines in multiple COs.

Figure 4A:
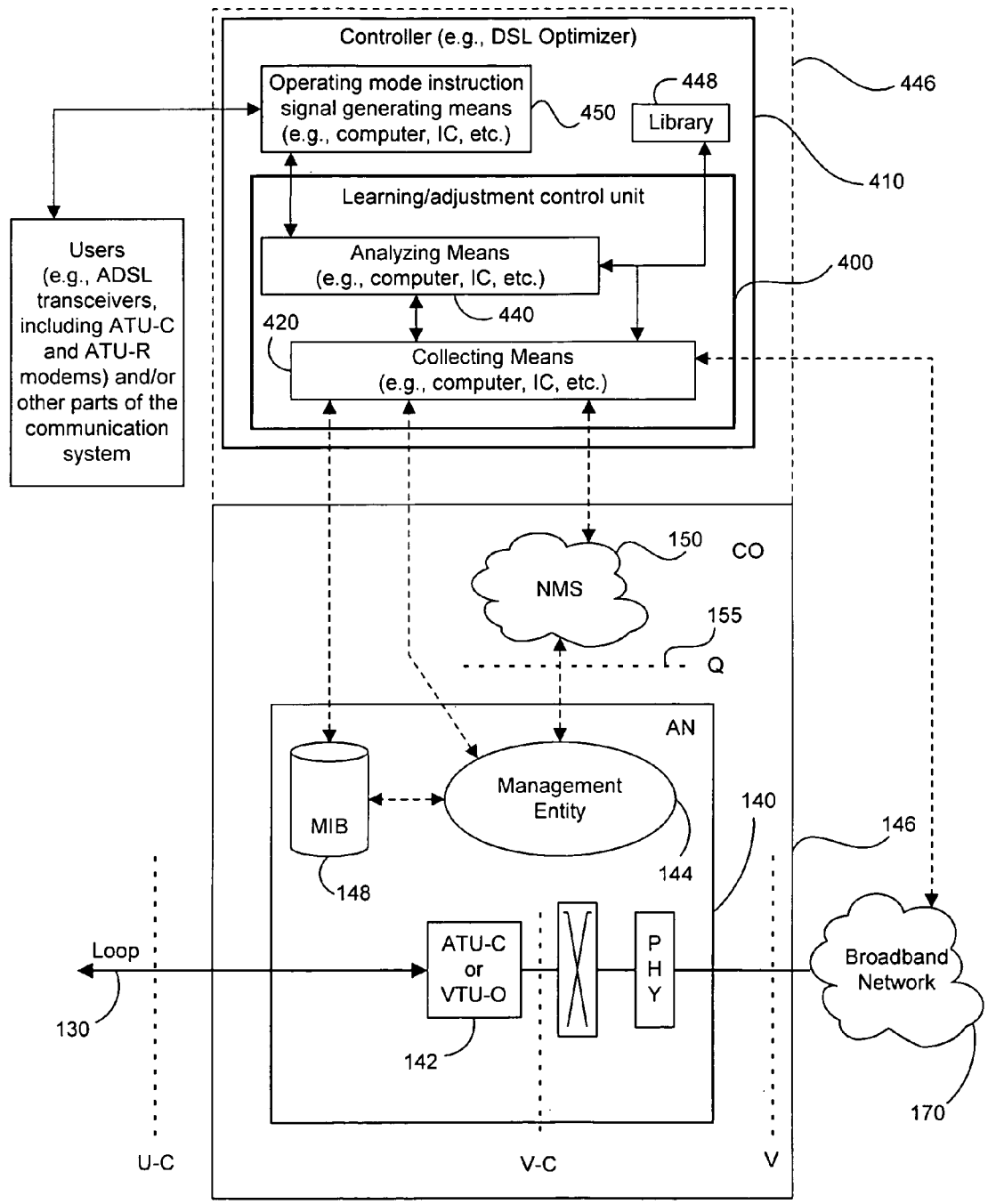
FIG. 4A is a controller including a learning/adjustment control unit according to one embodiment of the present invention.
Figure 4B:
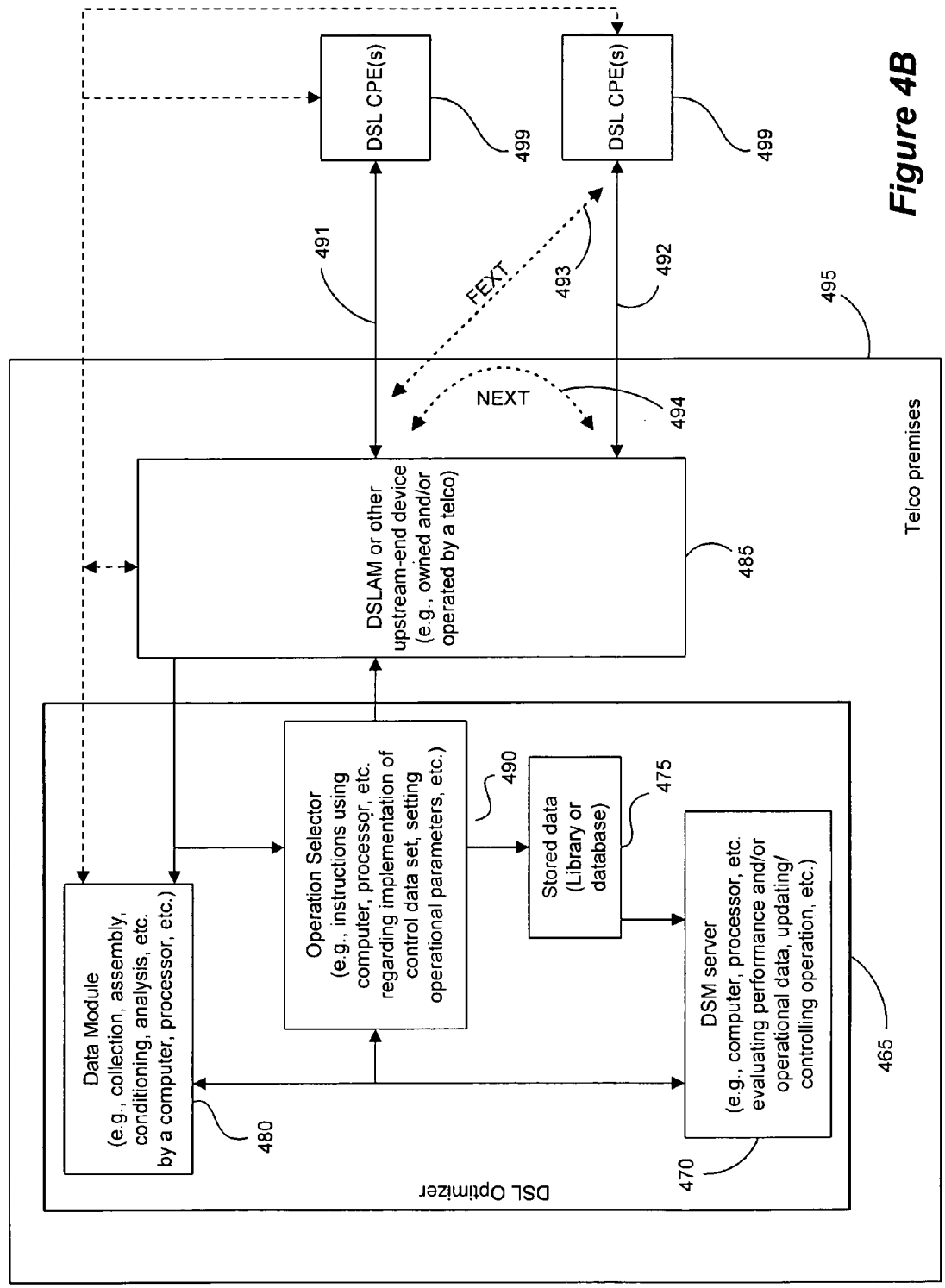
FIG. 4B is a DSL optimizer according to one embodiment of the present invention.

In some embodiments of the present invention, the controller 410 controls and/or communicates with a DSL system in a suspected and/or specific binder or set of lines implementing DSL services, for example communicating with one or more transmitters and/or receivers. The DSL lines may be ADSL, VDSL and/or other communication lines in various combinations. The learning/adjustment control unit 400 has access (directly or indirectly) to information and/or data regarding the various lines in the subject communication system and may be able to control certain aspects of those lines' operation. For example, the controller 410 and/or learning/adjustment control unit 400 may instruct lines to implement specific control data sets, transmit spectra, margin values, power levels, etc., and to do so in specific ways according to embodiments of the present invention, as shown in FIG. 4B. Also, the learning/adjustment control unit 400 may enable and/or disable operation of a set of communication lines, as appropriate.

The learning/adjustment control unit 400 includes a data collection unit identified as a collecting means 420 and an analysis unit identified as analyzing means 440. As seen in FIG. 4A, the collecting means 420 (which can be a computer, processor, IC, computer module, etc. of the type generally known) may be coupled to NMS 150, ME 144 at AN 140 and/or the MIB 148 maintained by ME 144, any or all of which may be part of an ADSL and/or VDSL system for example. Data also may be collected through the broadband network 170 (for example, via the TCP/IP protocol or other protocol or means outside the normal internal data communication within a given DSL system). One or more of these connections allows the learning/adjustment control unit 400 to collect operational data from the system (for example, to be used in its raw, unprocessed form or for processing by unit 400 to evaluate possible adjustments to a communication system coupled to unit 400). Data may be collected once or over time. In some cases, the collecting means 420 will collect on a periodic (for example, continuous) basis, though it also can collect data on-demand or any other non-periodic basis, thus allowing the learning/adjustment control unit 400 to update its information, operation, etc., if desired.

In the exemplary system of FIG. 4A, the analyzing means 440 (which also can be a computer, processor, IC, computer module, etc. of the type generally known) is coupled to a DSLAM, modem and/or system operating signal generating means 450, which may be inside or outside the controller 410. This signal generator 450 (which can be a computer, processor, IC, computer module, etc.) is configured to generate and send instruction signals to modems and/or other components of the communication system (for example, ADSL and/or VDSL transceivers and/or other equipment, components, etc. in the system). These instructions may include commands to implement various rules, operational parameter values, etc. designed to assist in executing one or more of the methods and/or techniques disclosed herein, to operate in a manner adjusted to use information obtained as a result of such methods and/or techniques, providing new and/or updated crosstalk information and matrices and/or any other operational characteristics of the relevant communication lines.

Embodiments of the present invention can utilize a database, library or other collection of data pertaining to the data collected, past operation of the vectored DSL system and any other relevant lines and equipment. This collection of reference data may be stored, for example, as a library 448 in the controller 410 of FIG. 4A and used by the analyzing means 440 and/or collecting means 420.

In various embodiments of the invention, the learning/adjustment control unit 400 and/or any of its components may be implemented in one or more processors, ICs, computers such as PCs, workstations or the like. The collecting means 420 and analyzing means 440 may be software modules, hardware modules or a combination of both, as will be appreciated by those skilled in the art. When working with a large numbers of modems, databases may be introduced and used to manage the volume of data collected.

Another embodiment of the present invention is shown in FIG. 4B. A DSL optimizer 465 operates on and/or in connection with a DSLAM 485 or other DSL system component, either or both of which may be on the premises 495 of a telecommunication company (a "telco"). The DSL optimizer 465 includes a data module 480, which can collect, assemble, condition, manipulate and supply operational data for and to the DSL optimizer 465. Module 480 can be implemented in one or more computers such as PCs or the like. Data from module 480 is supplied to a DSM server module 470 for analysis. Information also may be available from a library or database 475 that may be related or unrelated to the telco.

An operation selector 490 may be used to implement, modify and/or cease DSL and/or other communication operations, including implementation of various operational parameters involving transmit power, margin-related parameters, carrier masks, FEC settings like INP and delay etc. Moreover, implementing embodiments of the present invention, selector 490 can send instructions regarding operation of lines to ensure the generation of sufficient operational data by the adjusted DSL lines for later collection. Decisions may be made and analysis conducted by the DSM server 470 or in any other suitable manner, as will be appreciated by those skilled in the art.

Operational modes and/or parameters selected by selector 490 can be implemented in the DSLAM 485, one or more upstream receivers, and/or any other appropriate DSL system or communication system component equipment. Such equipment may be coupled to remote DSL equipment such as customer premises equipment 499, whose lines 491, 492 may induce NEXT 494 and FEXT 493 in one another. The system of FIG. 4B can operate in ways analogous to the system of FIG. 4A, as will be appreciated by those skilled in the art, though differences are achievable while still implementing embodiments of the present invention.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 5:
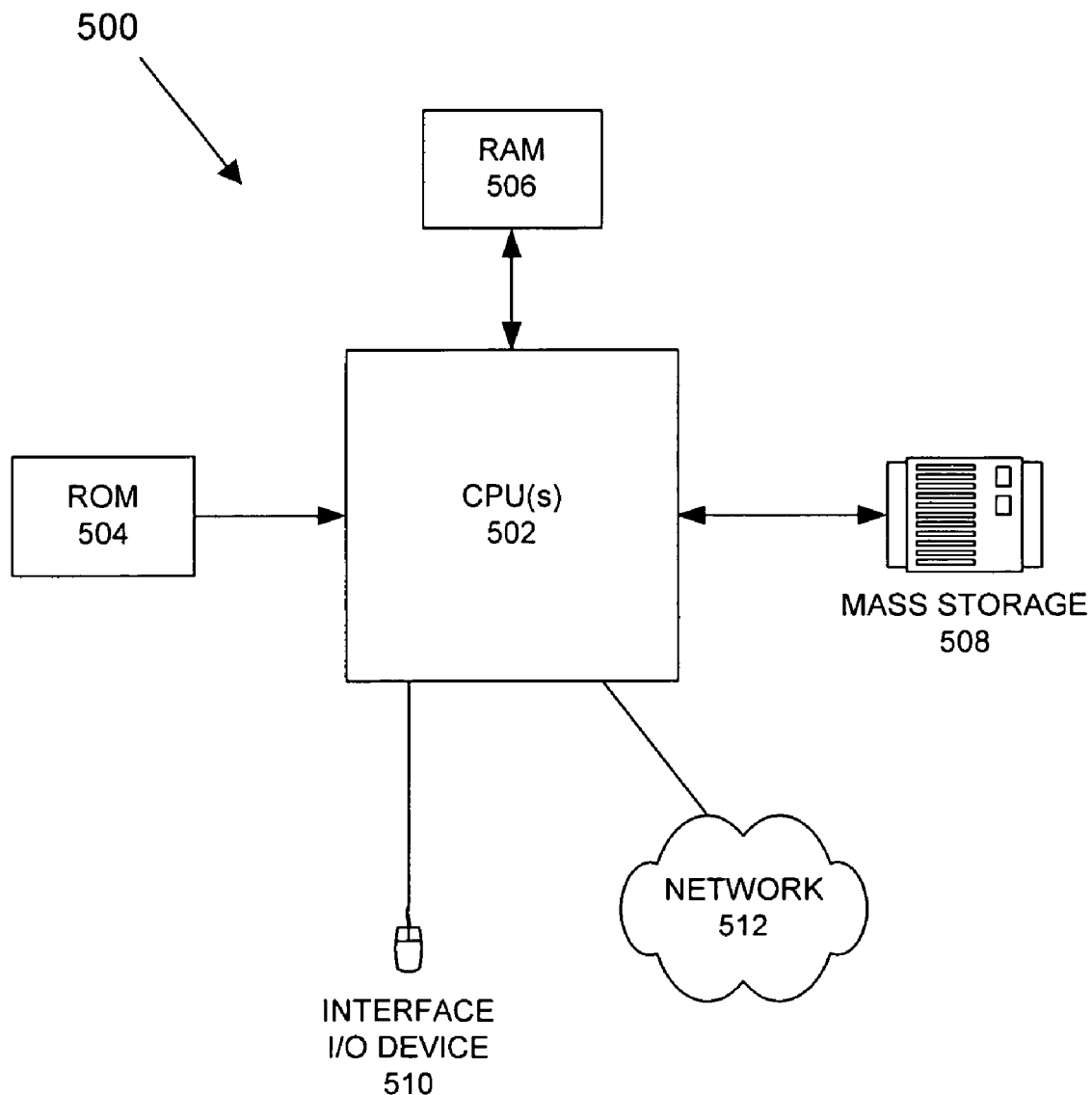
FIG. 5 is a block diagram of a typical computer system or integrated circuit system suitable for implementing embodiments of the present invention.

FIG. 5 illustrates a typical computer system that can be used by a user and/or controller in accordance with one or more embodiments of the present invention. The computer system 500 includes any number of processors 502 (also referred to as central processing units, or CPUs) that are coupled to storage devices including primary storage 506 (typically a random access memory, or RAM), primary storage 504 (typically a read only memory, or ROM). As is well known in the art, primary storage 504 acts to transfer data and instructions uni-directionally to the CPU and primary storage 506 is used typically to transfer data and instructions in a bi-directional manner. Both of these primary storage devices may include any suitable of the computer-readable media described above. A mass storage device 508 also is coupled bi-directionally to CPU 502 and provides additional data storage capacity and may include any of the computer-readable media described above. The mass storage device 508 may be used to store programs, data and the like and is typically a secondary storage medium such as a hard disk that is slower than primary storage. It will be appreciated that the information retained within the mass storage device 508, may, in appropriate cases, be incorporated in standard fashion as part of primary storage 506 as virtual memory. A specific mass storage device such as a CD-ROM 514 may also pass data uni-directionally to the CPU.

CPU 502 also is coupled to an interface 510 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to a computer or telecommunications network using a network connection as shown generally at 512. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 508 or 514 and executed on CPU 502 in conjunction with primary memory 506. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention is not limited to the details given herein but should be defined by the following claims and their full scope of equivalents, whether foreseeable or unforeseeable now or in the future.

What is claimed is:

1. A method of controlling operation of a Digital Subscriber Line (DSL) line set comprising a plurality of DSL lines, the method comprising:
   selecting a control DSL line set comprising one or more DSL lines selected from the plurality of DSL lines in the DSL line set;
   operating the control DSL line set using a first value of a control parameter vector;
   collecting operational data relating to operation of the control DSL line set using the first value of the control parameter vector;
   analyzing the collected operational data by evaluating a performance metric with respect to the control parameter vector; and
   adjusting the value of at least one control parameter of at least one DSL line of the DSL line set responsive to the evaluated performance metric.

2. The method of claim 1 wherein the control parameter vector comprises an array of one or more control parameters.

3. The method of claim 1 further comprising:
   operating the control DSL line set using a second value of the control parameter vector; and
   collecting operational data relating to operation of the control DSL line set using the second value of the control parameter vector;
   analyzing the collected operational data; and
   adjusting, responsive to the analyzing, the value of the second value of the control parameter vector for at least one DSL line of the DSL line set.

4. The method of claim 1 wherein analyzing the collected operational data comprises comparing the collected operational data to at least one of the following: historical operational data pertaining to the DSL line set; or historical operational data pertaining to the control DSL line set.

5. The method of claim 1 wherein the control DSL line set is at least one of the following: a plurality of DSL lines wherein the first DSL line set and the control DSL line set share one or more of the DSL lines; a second DSL line set in a first DSL binder, wherein the first DSL line set also is in the first DSL binder; a second DSL line set in a second DSL binder wherein the first DSL line set is in the first DSL binder; or a subset of the first DSL line set.

6. The method of claim 1 further comprising collecting operational data from the first DSL line set.

7. The method of claim 1 wherein analyzing the collected operational data comprises:
   defining the performance metric;
   evaluating a gradient of the performance metric with respect to the control parameter vector; and
   updating the value of the control parameter vector in the direction of the evaluated gradient.

8. The method of claim 1 wherein analyzing the collected operational data comprises:
   classifying the collected operational data into a plurality of clusters;
   evaluating the performance metric for each cluster in the plurality of clusters;
   selecting a first cluster based on the performance metric of the first cluster; and
   updating the value of the control parameter vector of the control DSL line set to match a control parameter vector value of the selected cluster.

9. The method of claim 1 wherein the control parameter vector comprises at least one of the following parameters: TSNRM; target noise margin; MAXSNRM; maximum noise margin; MINSNRM; minimum noise margin; CARMASK; PSDMASK; Maximum transmit power; Maximum delay; Minimum fNP; Trellis coding on/off, Pilot signal on/off-, Maximum data rate; Minimum data rate; BCAP[n]; CV count thresholds used for determining maximum delay; CV count thresholds used for determining minimum INP; FEC count thresholds used for determining maximum delay; or FEC count thresholds used for determining minimum INP.

10. The method of claim 1 wherein the operational data comprises data pertaining to at least one of the following parameters: average attenuation measurements; bit distributions; transmit power levels; reported current data rates; reported maximum attainable data rates; reported error-correction-parity; reported use of trellis codes; channel insertion loss; channel gains; channel phases; FEC code settings; total number of bit-swaps occurring in a recent time interval; FEC errors; code violations; errored seconds; noise power; peak-to-average noise power ratio; quiet-line noise levels; active-line noise levels; count of ATM or other protocol cells; higher-level protocol-throughput; retrain counts; count of failed synchronization attempts; reported carrier mask; reported tone-shaping parameters.

11. The method of claim 1 wherein one of the following comprises applying a weighting factor to the operational data: collecting the operational data; or analyzing the operational data.

12. The method of claim 1 wherein collecting operational data relating to operation of the control DSL line set comprises checking for compliance with at least one of the following: a data timeliness rule; or a data sufficiency rule.

13. A computer program product comprising:
a machine readable medium and program instructions contained in the machine readable medium, the program instructions specifying a method of controlling operation of a Digital Subscriber Line (DSL) line set comprising a plurality of DSL lines, the method comprising:
selecting a control DSL line set comprising one or more DSL lines selected from the plurality of DSL lines in the DSL line set;
operating the control DSL line set using a first value of a control parameter vector;
collecting operational data relating to operation of the control DSL line set using the first value of the control parameter vector;
analyzing the collected operational data by evaluating a performance metric with respect to the control parameter vector; and
adjusting the value of at least one control parameter of at least one DSL line of the DSL line set responsive to the evaluated performance metric.

14. A controller comprising:
a collection unit to collect operational data from a Digital Subscriber Line (DSL) line set comprising a plurality of DSL lines and from a control DSL line set comprising one or more DSL lines selected from the plurality of DSL lines in the DSL line set;
an analysis unit coupled to the collection unit, wherein the analysis unit is to:
select the control DSL line set, and
evaluate operation of the control DSL line set using a first value in a control parameter vector;
a control signal generator coupled to the analysis unit, wherein the control signal generator is to apply changes to one of the following:
a second value in the control parameter vector for of at least one DSL line in the DSL line set; or
the first value in control parameter vector for at least one of the DSL lines in the control DSL line set; and
wherein the controller is to:
learn information about the DSL line set and the control DSL line set by evaluating a performance metric with respect to the control parameter vector; and
adjust operation of at least one DSL line of the DSL line responsive to the evaluated performance metric.

15. The controller of claim 14 wherein the analysis unit is to:
select the control DSL line set to be a plurality of DSL lines wherein the first DSL line set and the control DSL line set share one or more of the DSL lines;
select the control DSL line set to be a second DSL line set in a first DSL binder, wherein the first DSL line set also is in the first DSL binder;
select the control DSL line set to be a subset of the first DSL line set; or
select the control DSL line set to be a second DSL line set in a second DSL binder, wherein the first DSL line set is in the first DSL binder.

16. The controller of claim 14 further wherein the controller is to:
define the performance metric;
evaluate a gradient of the performance metric with respect to the control parameter vector; and
update a value of the control parameter vector in the direction of the evaluated gradient.

17. The controller of claim 14 further wherein the controller is to:
classify the collected operational data into a plurality of clusters;
evaluate the performance metric for each cluster in the plurality of clusters;
select a first cluster based on the performance metric of the first cluster; and
update a control parameter vector value of the first DSL line set to match a control parameter vector value of the selected cluster.

18. The controller of claim 14 wherein either the collection unit or the analysis unit is to apply a weighting factor to the collected operational data.

19. The controller of claim 14 wherein the collection unit is to check for compliance with at least one of the following: a data timeliness rule; or a data sufficiency rule.

20. The controller of claim 14 wherein the control signal generator is to apply changes to at least one of the following control parameters: TSNRM; target noise margin; MAXSNRM; maximum noise margin; MINSNRM; minimum noise margin; CARMASK; PSDMASK; Maximum transmit power; Maximum delay; Minimum INP; Trellis coding on/off, Pilot signal on/off, Maximum data rate; Minimum data rate; BCAP[n]; CV count thresholds used for determining maximum delay; CV count thresholds used for determining minimum INP; FEC count thresholds used for determining maximum delay; or FEC count thresholds used for determining minimum INP.

21. The controller of claim 14 wherein the collection unit is to collect operational data comprising data pertaining to at least one of the following parameters: average attenuation measurements; bit distributions; transmit power levels; reported current data rates; reported maximum attainable data rates; reported error-correction-parity; reported use of trellis codes; channel insertion loss; channel gains; channel phases; FEC code settings; total number of bit-swaps occurring in a recent time interval; FEC errors; code violations; errored seconds; noise power; peak-to-average noise power ratio; quiet-line noise levels; active-line noise levels; count of ATM or other protocol cells; higher-level protocol-throughput; retrain counts; count of failed synchronization attempts; reported carrier mash; reported tone-shaping parameters.

22. The computer program product of claim 13, wherein analyzing the collected operational data comprises:

defining a performance metric;

evaluating a gradient of the performance metric with respect to the control parameter vector; and updating the value of the control parameter vector in the direction of the evaluated gradient.

* * * * *